2,885,396

N-GLYCOSIDES OF 5-FLUOROURACIL

Charles Heidelberger, Madison, Wis., and Robert Duschinsky, Essex Fells, N.J.

No Drawing. Application March 21, 1957
Serial No. 647,489

10 Claims. (Cl. 260—211.5)

This invention relates to novel chemical compounds, and to novel processes and novel intermediates useful for preparing said compounds. More particularly, it relates to N-glycosides of 5-fluorouracil and salts thereof with medicinally acceptable bases, and to the preparation of said glycosides and salts.

In one of its aspects, the invention relates to N-ribosides of 5-fluorouracil, and specifically to 5-fluorouridine, i.e. 1-β-D-ribofuranosyl-5-fluorouracil, which can be represented by the following structural formula:

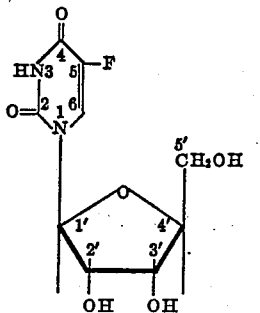

In another aspect, the invention relates to a process of preparing 5-fluorouridine which comprises reacting 5-fluorouracil with mercuric chloride, thereby producing mercury-di-5-fluorouracil; reacting the latter with a 2,3,5-tri-O-benzoyl-β-D-ribofuranosyl halide, thereby producing 5-fluoro-2′,3′,5′-tri-O-benzoyluridine; and debenzoylating the latter, thereby producing 5-fluorouridine.

Additionally, the invention relates to intermediates useful in practicing the above process, and specifically it relates to a mercuric salt of 5-fluorouracil and to 5-fluoro-2′,3′,5′-tri-O-benzoyluridine.

In still another aspect, the invention relates to N-deoxyribosides of 5-fluorouracil, and specifically to 2′-deoxy-5-fluorouridine, i.e. 1-(β-D-2-deoxyribofuranosyl)-5-fluorouracil, which can be represented by the following structural formula:

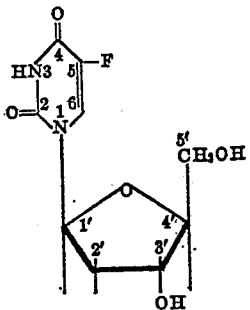

In still a further aspect, the invention relates to a process for preparing 2′-deoxy-5-fluorouridine which comprises enzymatically transferring deoxyribose from a naturally occurring deoxyriboside, such as thymidine, to 5-fluorouracil, thereby producing 2′-deoxy-5-fluorouridine.

The N-glycosides of 5-fluorouracil are useful as germicidal agents; being active, for example, against gram-positive bacteria, such as *Staphylococcus aureus*; and against fungi, such as *Scopulariopsis brevicaulis*. The N-glycosides of 5-fluorouracil are also useful as antimetabolites; for example, they interfere with nucleic acid metabolism and thus inhibit the growth of cells, e.g. *Lactobacillus leichmannii*.

The starting material for the processes of the present invention, 5-fluorouracil, is itself a novel compound, not hitherto described in any printed publication. In order that the disclosure of the present invention may be complete, one method of preparing this compound is described herewith.

PREPARATION OF 5-FLUOROURACIL

A mixture of 200 g. (2 mols) of dry sodium fluoroacetate and 442 g. (2.86 mols) of diethyl sulfate was refluxed for three and one-half hours in an oil bath. The reaction mixture was then distilled through a fractionating column, yielding 177.3 g. of crude ethyl fluoroacetate, having a boiling range of 116°–120° C. The material was redistilled through a fractionating column, yielding purified ethyl fluoroacetate boiling at 114°–118° C.

In a 2-liter, 3-neck, round bottom flask, provided with stirrer, dropping funnel and reflux condenser, was placed 880 ml. of absolute diethyl ether, and 47.6 g. (1.22 mols) of potassium, cut into 5 mm. pieces, was suspended therein. 220 ml. of absolute ethanol was added dropwise, while stirring, whereby the heat of reaction produced refluxing. In order to obtain complete dissolution of the potassium, the mixture was finally refluxed on a steam bath. The reaction mixture was then cooled in an ice bath, and a mixture of 135 g. (1.22 mols) of ethyl fluoroacetate and 96.4 g. (1.3 mols) of freshly distilled ethyl formate was added dropwise, while stirring and cooling, over a period of two and one-half hours. Upon completion of the addition of the ethyl formate, the reaction mixture was stirred for an additional hour while cooling, and then was allowed to stand overnight at room temperature. At the end of this time the crystalline precipitate which had formed was filtered off with suction, washed with diethyl ether, and dried in a vacuum desiccator. The product comprised essentially the potassium enolate of ethyl fluoromalonaldehydate (alternative nomenclature, the potassium salt of fluoromalonaldehydic acid ethyl ester).

A mixture of 103.6 g. (0.6 mol) of the freshly prepared potassium enolate of ethyl fluoromalonaldehydate, 83.4 g. (0.3 mol) of S-methylisothiouronium sulfate and 32.5 g. (0.6 mol) of sodium methoxide was refluxed with stirring in 1500 ml. of absolute methanol. At first the reactants dissolved to a great extent, but very shortly thereafter precipitation occurred. The reaction mixture was refluxed for two hours and at the end of this time was evaporated to dryness in vacuo. The residue was treated with 280 ml. of water; incomplete dissolution was observed. The mixture obtained was clarified by filtering it through charcoal. The filtrate was acidified (to a slight Congo acid reaction) by adding concentrated aqueous hydrochloric acid, containing 37% by weight HCl (48 ml. required). The material which crystallized from the acidified solution was filtered off, washed free of sulfates with water and dried at 100° C., yielding crude S-methyl ether of 2-thio-5-fluorouracil, having a melting range from 202° to 221° C. The latter material was recrystallized by dissolving it in 2035 ml. of boiling ethyl acetate and cooling to minus 20° C., yielding S-methyl ether of 2-thio-5-fluorouracil, M.P. 230°–237° C., in a sufficient state of purity that it could be used directly for the next step. A sample of the material was recrystallized from water (alternatively, from ethyl acetate) thereby raising the melting point to 241°–243° C. For analysis the material was further purified by subliming it in vacuo at 140°–150° C./0.1 mm.

A solution of 10.0 g. of purified S-methyl ether of 2-thio-5-fluorouracil, M.P. 230°–237° C., in 150 ml. of concentrated aqueous hydrochloric acid (containing approximately 37% by weight HCl) was refluxed under nitrogen for four hours. The reaction mixture was then evaporated in vacuo. The crystalline brownish residue was recrystallized from water. The resulting recrystallized product was further purified by sublimation in vacuo at 190°–200° C. (bath temperature)/0.1 mm. pressure. There was obtained 5-fluorouracil, in the form of colorless or pinkish-tan crystals, M.P. 282°–283° C. (with decomposition).

The invention is further disclosed in the following examples, which are illustrative but not limitative thereof. Temperatures are stated in degrees centigrade.

Example 1

MERCURY-DI-5-FLUOROURACIL

To a solution of 2.3 g. (17.7 mM.) of 5-fluorouracil in 82 ml. of 0.086 N aqueous sodium hydroxide there was added a solution of 4.81 g. (17.7 mM.) of mercuric chloride in 16 ml. of ethanol. The pH of the mixture was adjusted to 5.1 by addition of 8.5 ml. of 1 N aqueous sodium hydroxide, whereupon mercury-di-5-fluorouracil precipitated. The mixture was allowed to remain overnight at 4°, and the crystalline product was then filtered off and washed chlorine-free with water, then with ethanol and finally with diethyl ether. Yield 3.3 g. (79.4%).

*Analysis.*—Calculated for $(C_4H_2O_2N_2F)_2Hg$: N, 11.90. Found: N, 12.12.

5-FLUORO-2′,3′,5′-TRI-O-BENZOYLURIDINE

To 245 ml. of anhydrous diethyl ether, previously saturated with hydrogen chloride at 0°, there was added 13.2 g. (26.2 mM.) of 1-O-acetyl-2,3,5-tri-O-benzoyl-β-D-ribose [Kissmann et al., J.A.C.S. 77, 21 (1955)]. The stoppered flask was allowed to remain at 4° for eight days. The solvent was then removed in vacuo, and thrice 40 ml. of anhydrous benzene was added to the residue and each time removed in vacuo. The residue of 2,3,5-tri-O-benzoyl-β-D-ribofuranosyl chloride was dissolved in 73 ml. of benzene.

A dry suspension of the mercury-di-5-fluorouracil was prepared by suspending 6 g. (13.1 mM.) of said mercuric salt in 130 ml. of xylene, and distilling off 40 ml. of xylene. The remaining 90 ml. of suspension was heated, and to it, while stirring, was added the 73 ml. benzene solution of tri-O-benzoyl-β-D-ribofuranosyl chloride. The mixture was refluxed for one and one-half hours, and filtered while hot. The insoluble crystalline precipitate, M.P. 236°–257°, was identified as impure 5-fluorouracil: 2.78 g., representing a recovery of about 82%. The filtrate was cooled, whereupon 5-fluoro-2′,3′,5′-tri-O-benzoyl-uracilribofuranoside crystallized. This crystalline precipitate was filtered off, washed with a little benzene, then with diethyl ether. Yield, 1.9 g., M.P. 185°–189°. This material was dissolved in 22 ml. of warm ethyl acetate, then 54 ml. of petroleum ether (30°–60°) was added; the mixture was allowed to stand in the refrigerator, whereupon 0.85 g. of a pure product, M.P. 207°–209°, crystallized.

The benzene-xylene filtrate, upon standing, yielded a second crop (2.07 g.) of crude product, M.P. 182°–184°. This was recrystallized in the manner previously indicated, by dissolving it in 25 ml. of warm ethyl acetate and adding 33 ml. of petroleum ether (30°–60°), thereby obtaining 1.33 g. of pure 5-fluoro-2′,3′,5′-tri-O-benzoyl-uracilribofuranoside, M.P. 207°–209°.

*Analysis.*—Calc'd for $C_{30}H_{23}O_9N_2F$: C, 62.72; H, 4.04; N, 4.88. Found: C, 62.54; H, 4.01; N, 4.86.

Addition of 500 ml. of petroleum ether (30°–60°) to the mother liquor produced a third crop of gummy product. This was sepaarted by decantation of the liquors, and was dissolved in 110 ml. of chloroform. A little insoluble material was filtered off. The chloroform filtrate was freed of mercury by washing with three 20 ml. portions of aqueous potassium iodide solution (containing 30% by weight KI), then was washed five times with water and finally was dried over sodium sulfate. The chloroform was removed on a water bath in vacuo, leaving an oil, which solidified upon treatment with petroleum ether (30°–60°). The solid was filtered off and washed with petroleum ether (30°–60°). Yield, 5.83 g. The material was recrystallized in the manner described above, by dissolving in 18 ml. of warm ethyl acetate and adding 25 ml. of petroleum ether (30°–60°), thereby yielding 0.87 g. of a purified compound, M.P. 196°–200°. A second recrystallization from 10 ml. of ethyl acetate, to which was added 32 ml. of petroleum ether (30°–60°), yielded 0.53 g. of pure product, M.P. 207°–209°.

The total yield of pure product of M.P. 207°–209° was 2.71 g., corresponding to 18% of the theory, based upon 5-fluorouracil put into reaction; not taking into account the recovered 5-fluorouracil.

5-FLUOROURIDINE

A suspension of 1 g. (1.74 mM.) of 5-fluoro-2′,3′,5′-tri-O-benzoyl-uracilribofuranoside, M.P. 207°–209°, in 20 ml. of ethanolic ammonia (saturated at 0°) was heated in a sealed tube at 100° for 16 hours. The brown solution obtained was evaporated to dryness in vacuo. The residue was thrice taken up with 30 ml. of water and each time was evaporated to dryness. The brown semi-crystalline residue was taken up with 30 ml. of water and the turbid suspension obtained was extracted with five 10 ml. portions of diethyl ether, the ethereal extract being discarded. The aqueous layer was evaporated to dryness in vacuo, leaving a foamy brownish residue, which was dissolved in 2 ml. of ethanol. Addition of 8 ml. of diethyl ether precipitated 220 mg. of a tan solid.

To the mother liquor was added 30 ml. of diethyl ether, precipitating a second crop of product, M.P. 143°–144° (with previous softening); weight, 35 mg.

The mother liquor from this product was evaporated to dryness in vacuo, and the residue obtained was taken up with 0.5 ml. of ethanol. Addition of 10 ml. of diethyl ether precipitated a third crop of product, M.P. 136°–138° (with previous softening); weight, 70 mg.

For further purification of the crude N-riboside of 5-fluorouracil, the first crop of 220 mg. was dissolved in 1 ml. of 1 N aqueous sodium hydroxide solution, thereby producing a solution containing sodium salt of 5-fluorouridine. This solution was then passed through a 1.1 cm. x 23 cm. column of "Dowex 1–X4" (Dow Chemical Co., Midland, Michigan: an anion exchange resin consisting of a cross-linked copolymer of styrene with divinyl benzene [4% of the latter], containing quaternary ammonium groups as the functional groups), 100–200 mesh size, previously converted to the formate form. The resin was washed with water until the washings were neutral. Then elution was performed with 0.01 N aqueous formic acid, the eluate being collected at the rate of about 1 ml. per minute, in fractions of 25 ml. Each fraction was examined individually for ultraviolet absorption; in each of fractions 2 to 6, the ratio of absorbances 280 mμ/260 mμ was 0.99 (pH 14). The total absorbance (optical density observed × dilution of sample × total vol. in ml.) was 2070, λ max. 270 mμ (pH 14).

Fractions 2 to 6 were then combined and evaporated to dryness in vacuo at 50°. The oily residue was dissolved in 0.3 ml. of ethanol, and 4 ml. of diethyl ether was added to the solution, producing an amorphous precipitate. This was filtered off and dissolved in 3 ml. of ethanol at 60°. Diethyl ether was added to the solution until cloudiness began to appear. The mixture was then allowed to stand overnight. The slight amount of amorphous precipitate which resulted was filtered off. The filtrate, upon evaporation in vacuo at 45°, yielded a crystalline residue of 5-fluorouridine, weighing 48 mg. When observed on a hot stage under the microscope, the substance melted at 151°–152°, resolidified, and then melted again at 180°–182°, after some softening at 165°. The ultraviolet absorption was characteristic for a riboside, and was similar to that of uridine, but with a shift of the maximum to longer wave length. As expected for a riboside, and in contrast to the free pyrimidine, there was practically no shift of the maximum in alkaline medium: at pH 7.2, $\lambda$ max.=269 m$\mu$, $\epsilon$=8120; at pH 14, $\lambda$ max.=270 m$\mu$, $\epsilon$=6500.

*Analysis.*—Calculated for $C_9H_{11}O_6N_2F$: C, 41.22; H, 4.23. Found: C, 41.45; H, 4.75.

The second crop (35 mg., M.P. 143°–144°) and the third crop (70 mg., M.P. 136°–138°) of crude N-riboside of 5-fluorouracil, referred to above, were combined and purified by ion exchange chromatography, as described above. There was thus obtained 90 mg. of purified crystalline material; micro M.P. 147°–152°, resolidified, then melted again at 177°–178°, with previous softening at 172°. At pH 7.2, $\lambda$ max.=270 m$\mu$, $\epsilon$=7540; at pH 14, $\lambda$ max.=270 m$\mu$, $\epsilon$=6330.

*Analysis.*—Calc'd. for $C_9H_{11}O_6N_2F$: C, 41.22; H, 4.23. Found: C, 41.29; H, 4.08; ash 1.8%.

The total yield of 5-fluorouridine was 138 mg., i.e. 30.3% based upon tribenzoyl-5-fluorouridine, 5.5% based upon 1-O-acetyl-2,3,5-tri-O-benzoyl-$\beta$-D-ribose, and 4.3% based upon 5-fluorouracil put into reaction.

5-fluorouridine exhibits acidic properties and forms salts with bases. The invention includes salts obtained by reacting 5-fluorouridine with medicinally acceptable bases, e.g. alkali metal hydroxides, alkaline earth metal hydroxides, ammonia, non-toxic organic bases, such as ethanolamine, and the like.

5-fluorouridine and its salts with medicinally acceptable bases are useful as antibacterial compounds, being active, for example, against *St. aureus, B. subtilis* and *B. simplex*, also as antifungal compounds against fungi such as *Scopulariopsis brevicaulis* and *C. albicans*.

*Example 2*

Cells of *Streptococcus fecalis* (ATCC–8043) were grown in the AOAC folic acid assay medium [Lepper, Official and Tentative Methods of the Association of Official Agricultural Chemists, Washington, D.C., 7th edition, 784 (1950)], supplemented with 2 mg. per liter of thymine; following the teachings of Prusoff, Proc. Soc. Exp. Biol. & Med. 85, 564 (1954). After 20 hours of incubation at 37°, the cells were harvested by centrifugation. The collected cells were washed three times with four volumes of potassium phosphate buffer solution (M/15 aqueous $KH_2PO_4$ solution, adjusted to pH 8.0 by addition of 2 N aqueous KOH) and the wet cells were weighed. The cells were finally suspended in the above potassium phosphate buffer solution and ground in a glass tissue homogenizer.

An amount of enzyme preparation equivalent to 900 mg. of wet cells was made up to 25 ml. with the above potassium phosphate buffer solution. 150 mg. (1.15 mM.) of 5-fluorouracil and 1.0 gram of thymidine (4.12 mM.) were dissolved in 15 ml. of the above potassium phosphate buffer solution. The mixture was incubated at 37° for 18 hours. After this time, enzyme action was stopped by the addition of four volumes of acetone and one volume of peroxide-free diethyl ether. The precipitated solids were removed by filtration, and the filtrate was evaporated under nitrogen at reduced pressure until substantially all volatile organic solvent had been removed. About 20 ml. of aqueous solution, essentially free of organic solvent, remained. This solution was diluted to 100 ml. with distilled water.

Ten microliters of this solution were submitted to descending chromatography on a paper buffered with 0.2 N $KH_2PO_4$ (pH 7.8), using a solvent mixture of tertiary amyl alcohol:water:n-butyl ether (80:13:7 by volume). A spot visible under ultraviolet light and having $R_f$=0.55 was leached with 0.1 N HCl and assayed for deoxyribose by the method of Stumpf, J. Biol. Chem. 169, 367 (1947). This analysis indicated the presence of a minimum of 85.5 mg. (0.35 mM.) of 2'-deoxy-5-fluorouridine in the protein-free reaction mixture.

2'-deoxy-5-fluorouridine exhibits acidic properties and forms salts with bases. The invention includes salts obtained by reacting 2'-deoxy-5-fluorouridine with medicinally acceptable bases, e.g. alkali metal hydroxides, alkaline earth metal hydroxides, ammonia, non-toxic organic bases, such as ethanolamine, and the like.

2'-deoxy-5-fluorouridine and its salts with medicinally acceptable bases are useful as antibacterial and antifungal compounds, being active, for instance, against *St. aureus, Sarcina lutea, B. subtilis, E. bacillus, B. simplex, Scopulariopsis brevicaulis, C. albicans,* and the like.

*Example 3*

Cells of *Streptococcus fecalis* (ATCC–8043) were grown in the same AOAC folic acid assay medium identified in Example 2 above, supplemented with 2 mg. per liter of thymine. After 20 hours of incubation at 37°, the cells were harvested by centrifugation. The collected cells were washed three times with four volumes of the same potassium phosphate buffer solution identified in Example 2, and the wet cells were weighed. The cells were finally suspended in the above potassium phosphate buffer solution, and ground in a glass tissue homogenizer.

An amount of enzyme preparation of equivalent to 4.06 g. of wet cells was made up to 105 ml. with the above identified potassium phosphate buffer solution. 200 mg. (1.54 mM.) of 5-fluorouracil and 1.50 g. (6.16 mM.) of thymidine were dissolved in 15 ml. of the potassium phosphate buffer solution referred to above. The two solutions were mixed, making a total volume of 120 ml. The mixture was incubated at 37° for 18 hours. After this time, enzyme action was stopped by the addition of four volumes of acetone and one volume of peroxide-free diethyl ether. The precipitated solids were removed by filtration, and the filtrate was evaporated under nitrogen at reduced pressure until substantially all volatile organic solvent had been removed. About 20 ml. of aqueous solution remained. This solution was diluted to 100 ml. with distilled water.

The solution was again evaporated in vacuo to 5 ml., and rendered alkaline by addition of 20 ml. of 1 N aqueous sodium hydroxide solution, thereby producing a mixture containing sodium salts of: N-deoxyriboside of 5-fluorouracil, thymine, thymidine and 5-fluorouracil. This mixture was purified by adsorption on an ion exchange resin and subsequent elution by means of buffer solutions of gradually increasing acidity; whereby the pyrimidine components of the mixture were eluted in the following order: thymidine, thymine, 5-fluorouracil and 2'-deoxy-5-fluorouridine. The purification was effected by passing the above mentioned alkaline mixture through a 2.2 cm. x 27 cm. column of "Dowex 1–X4" (identified Example 1 above), 100–200 mesh size, previously converted to formate form and washed to neutrality as in Example 1. The column was then eluted with 280 ml. aqueous ammonium formate buffer solution (pH 9.8) having a normality of 0.1 with respect to formate ion. The eluate contained no ultraviolet absorbing material. Elution was continued with aqueous ammonium formate buffer solution (pH 7.4) having a normality of 0.1 with respect to formate ion, at a flow rate of 46 ml. per hour. Then the elution was still further continued with aqueous ammonium formate buffer solution (pH 6.5) having a normality of 0.1 with respect to formate ion, at a flow rate of 60 ml. per hour. Fractions were separated at 30 minute intervals and individually examined for ultraviolet absorption at wave lengths of 260 mμ and 280 mμ (pH 14).

| Eluant | Fractions | Total Absorbance (pH 14) | | Average ratio, 280 mμ/ 260 mμ | mM. | | | |
|---|---|---|---|---|---|---|---|---|
| | | 260 mμ | 280 mμ | | A | B | C | D |
| pH 7.4 | 1-5 | 0 | 0 | | | | | |
| pH 7.4 | 6-17 | 23,700 | 24,500 | a 1.04 | 2.33 | 2.41 | | |
| pH 7.4 | 18-26 | 0 | 0 | | | | | |
| pH 6.5 | 27-33 | 0 | 0 | | | | | |
| pH 6.5 | 34-48 | 3,760 | 5,870 | b 1.56 | | | 0.56 | c 0.44 |
| pH 6.5 | 49-50 | 0 | 0 | | | | | | a Gradually increasing from 0.75 to 1.5.
b Gradually decreasing from 1.97 to 0.98.
c 0.5 mM. of deoxyribose when assayed by method of Stumpf, op. cit.
A=thymine.
B=thymidine.
C=5-fluorouracil.
D=2'-deoxy-5-fluorouridine.

Examination of the ultraviolet absorption spectra of the individual fractions, and paper chromatography of the individual fractions, showed that fractions 6 to 17, inclusive, contained only thymine and thymidine, whereas fractions 34 to 48, inclusive, contained the fluoro compounds. Fractions 34 to 48, inclusive, were therefore combined and evaporated to dryness in vacuo. The residue obtained was dissolved in 30 ml. of the upper phase of a two-phase mixture obtained by mixing 60 volumes of ethyl acetate, 35 volumes of water, and 5 volumes of formic acid. A column 4.4 cm. x 49 cm. was then constructed by wetting 285 g. of cellulose powder (ashless, standard grade) with the upper phase of the above mentioned ethyl acetate-water-formic acid system, and tamping the wet cellulose into the absorption tube with a rod. The 30 ml. of solution were then passed through the column. Elution was performed with the upper phase of the same ethyl acetate-water-formic acid system mentioned above, at a flow rate of 40 ml. per hour, the fractions being collected at half hour intervals. The fractions were individually examined for ultraviolet absorption at wave lengths of 260 mμ and 280 mμ (pH 14).

| Fractions | Total Absorbance (pH 14) | | Average ratio, 280 mμ/ 260 mμ | mM. | |
|---|---|---|---|---|---|
| | 260 mμ | 280 mμ | | C | D |
| 1-56 | 0 | 0 | | | |
| 57-93 | 1,405 | 3,735 | 2.61 | 0.57 | 0.01 |
| 94 | 0 | 0 | | | |
| 95-96 | 118 | 124 | 1.05 | negligible | 0.02 |
| 97-104 | 2,075 | 1,905 | 0.92 | 0 | a 0.38 | a 0.39 mM. of deoxyribose, when assayed by the method of Stumpf, op. cit.
C=5-fluorouracil.
D=2'-deoxy-5-fluorouridine.

Fractions 97 to 104 were combined, and evaporated to dryness in vacuo at 45°. The residue of 2'-deoxy-5-fluorouridine was obtained as a colorless glass. Yield 96 mg. (25.3%). The compound showed the characteristic ultraviolet absorption for a deoxyriboside, similar to that of deoxyuridine, but with a shift of the maximum to longer wave length; as expected for a deoxyriboside, and in contrast to the free pyrimidine, there was only a slight shift of the maximum in alkaline medium: at pH 7.2, λ max.=268 mμ, ε=7570; at pH 14, λ max.=270 mμ, ε=6480.

We claim:
1. A compound selected from the group consisting of N-glycosides of 5-fluorouracil and salts thereof with medicinally acceptable bases.
2. N-glycosides of 5-fluorouracil.
3. N-ribosides of 5-fluorouracil.
4. N-deoxyribosides of 5-fluorouracil.
5. 5-fluorouridine.
6. 2'-deoxy-5-fluorouridine.
7. A process which comprises reacting 5-fluorouracil with mercuric chloride, thereby producing mercury-di-5-fluorouracil; reacting the latter with a 2,3,5-tri-O-benzoyl-β-D-ribofuranosyl halide, thereby producing 5-fluoro-2',3',5'-tri-O-benzoyluridine; and debenzoylating the latter, thereby producing 5-fluorouridine.
8. 5-fluoro-2',3',5'-tri-O-benzoyl-uracilribofuranoside.
9. Mercury-di-5-fluorouracil.
10. 5-fluoro-2',3',5'-tri-O-benzoyluridine.

References Cited in the file of this patent
UNITED STATES PATENTS

| 2,146,899 | Karrer | Feb. 14, 1939 |
| 2,342,760 | Schwaneberg | Feb. 29, 1944 |
| 2,374,503 | Rudert | Apr. 24, 1945 |
| 2,698,844 | Dimroth et al. | Jan. 4, 1955 |
| 2,770,573 | Gyorgy et al. | Nov. 13, 1956 |
| 2,795,580 | Khorana | June 11, 1957 |

OTHER REFERENCES

Fukuhara et al.: "J. Biol. Chem.," vol. 190 (1951), pp. 95 to 100.

Davoll et al.: "J. Am. Chem. Soc.," vol. 73, pp. 1650 to 1655 (1951).

Anand et al.: "Chem. Soc. Journal," 1952, part 3, pp. 3665-3669.

"Jour. Am. Chem. Soc.," vol. 77, pp. 4279 to 4286 (1955).